United States Patent
Kalhan

(10) Patent No.: US 11,310,008 B2
(45) Date of Patent: Apr. 19, 2022

(54) DATA TRANSMISSION WITH MULTIPLE NUMEROLOGIES FOR MULTIPLE DEVICES WITH COMMON GEOGRAPHICAL LOCATION DEPENDENT CONTROL INFORMATION

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1 day.

(21) Appl. No.: 16/754,664

(22) PCT Filed: Oct. 3, 2018

(86) PCT No.: PCT/US2018/054194
§ 371 (c)(1),
(2) Date: Apr. 8, 2020

(87) PCT Pub. No.: WO2019/083702
PCT Pub. Date: May 2, 2019

(65) Prior Publication Data
US 2020/0244412 A1 Jul. 30, 2020

Related U.S. Application Data

(60) Provisional application No. 62/723,094, filed on Aug. 27, 2018, provisional application No. 62/575,907, filed on Oct. 23, 2017.

(51) Int. Cl.
*H04L 5/00* (2006.01)

(52) U.S. Cl.
CPC .......... *H04L 5/0046* (2013.01); *H04L 5/0007* (2013.01); *H04L 5/0069* (2013.01)

(58) Field of Classification Search
CPC ... H04L 5/0003; H04L 5/0005; H04L 5/0007; H04L 5/0044; H04L 5/0046; H04L 5/0053; H04L 5/0069
See application file for complete search history.

(56) References Cited

U.S. PATENT DOCUMENTS

| | | | | |
|---|---|---|---|---|
| 9,788,341 B2 * | 10/2017 | Wilkinson | ........ | H04W 72/1231 |
| 9,955,484 B2 * | 4/2018 | Soret | ................. | H04W 74/0833 |
| 10,902,263 B1 * | 1/2021 | Angel | ................ | G06K 9/00825 |

(Continued)

FOREIGN PATENT DOCUMENTS

| | | | | |
|---|---|---|---|---|
| EP | 2665326 A1 * | 11/2013 | ........... | G01S 5/0289 |
| WO | 2016069340 A1 | 10/2016 | | |

(Continued)

*Primary Examiner* — Kevin D Mew

(57) ABSTRACT

A base station transmits a transmission signal to a first device and a second device where the transmission signal includes time-frequency resources using different numerologies and conveys first data to the first device and second data to the second device and common geographic location dependent control information to both devices. The transmission comprises a first set of time-frequency resources having a first numerology and a second set of time-frequency resources having a second numerology. The first data is transmitted over the first set of time-frequency resources and the common geographic location dependent control information is transmitted over the second set of time-frequency resources.

19 Claims, 13 Drawing Sheets

(56) References Cited

U.S. PATENT DOCUMENTS

| | | | | |
|---|---|---|---|---|
| 11,134,402 B1* | 9/2021 | Boyapati | | H04W 16/28 |
| 2009/0168715 A1* | 7/2009 | Cai | | H04W 72/02 |
| | | | | 370/329 |
| 2012/0099540 A1* | 4/2012 | Doppler | | H04L 25/0242 |
| | | | | 370/329 |
| 2013/0064197 A1 | 3/2013 | Novak et al. | | |
| 2014/0280955 A1* | 9/2014 | Stuntebeck | | G06F 21/10 |
| | | | | 709/226 |
| 2015/0036509 A1 | 2/2015 | Lopes et al. | | |
| 2015/0103933 A1* | 4/2015 | Nagata | | H04B 7/0482 |
| | | | | 375/260 |
| 2015/0117239 A1* | 4/2015 | Lindoff | | H04W 72/08 |
| | | | | 370/252 |
| 2015/0163842 A1* | 6/2015 | Kalhan | | H04W 84/18 |
| | | | | 455/500 |
| 2016/0044619 A1* | 2/2016 | Ryu | | H04W 72/0446 |
| | | | | 370/350 |
| 2016/0100023 A1* | 4/2016 | Kim | | H04W 12/04 |
| | | | | 709/227 |
| 2016/0295624 A1* | 10/2016 | Novlan | | H04W 72/04 |
| 2016/0381032 A1* | 12/2016 | Hashmi | | G06F 9/45533 |
| | | | | 726/4 |
| 2017/0164349 A1* | 6/2017 | Zhu | | H04W 76/10 |
| 2017/0181149 A1* | 6/2017 | Ang | | H04L 5/0094 |
| 2017/0265229 A1* | 9/2017 | Yang | | H04L 27/183 |
| 2017/0289767 A1* | 10/2017 | Yu | | H04W 72/048 |
| 2017/0332359 A1* | 11/2017 | Tsai | | H04B 7/0639 |
| 2017/0353250 A1* | 12/2017 | Costa | | H04W 16/14 |
| 2018/0049222 A1* | 2/2018 | Manolakos | | H04W 72/1263 |
| 2018/0091373 A1* | 3/2018 | Manolakos | | H04L 1/0006 |
| 2018/0097673 A1* | 4/2018 | Nangia | | H04L 5/001 |
| 2018/0097678 A1* | 4/2018 | Zhou | | H04W 72/1289 |
| 2018/0098312 A1* | 4/2018 | Lin | | H04L 5/0053 |
| 2018/0115963 A1* | 4/2018 | Luo | | H04L 5/0048 |
| 2018/0131493 A1* | 5/2018 | Luo | | H04L 5/0007 |
| 2019/0239046 A1* | 8/2019 | Kalhan | | H04B 7/0413 |
| 2020/0044813 A1* | 2/2020 | Kalhan | | H04W 72/1289 |
| 2020/0236660 A1* | 7/2020 | Kalhan | | H04B 7/0413 |

FOREIGN PATENT DOCUMENTS

| | | |
|---|---|---|
| WO | 2016167634 A1 | 10/2016 |
| WO | 2017098441 A1 | 6/2017 |

* cited by examiner

DATA TRANSMISSION WITH MULTIPLE NUMEROLOGIES FOR MULTIPLE DEVICES WITH COMMON GEOGRAPHICAL LOCATION DEPENDENT CONTROL INFORMATION

CLAIM OF PRIORITY

The present application claims priority to U.S. Provisional Application No. 62/575,907 filed on Oct. 23, 2017, and U.S. Provisional Application No. 62/723,094 filed on Aug. 27, 2018, and assigned to the assignee hereof.

FIELD

This invention generally relates to wireless communications and more particularly to devices and methods for transmitting a signal having a time-frequency resources with multiple numerologies to multiple user equipment (UE) devices with common geographical location control information.

BACKGROUND

In conventional communication systems, base stations transmit signals to multiple devices within a service area where each device receives unique control information based on its specific geographical location. Some examples of control information that is dependent on the geographical location of the UE device include parameters related to multiple input multiple output (MIMO) antenna. In some situations, modulations coding scheme (MCS) parameters may also be the same.

Machine type communication (MTC) and narrow band Internet of Things (NB-IoT are forms of data communication which involve one or more entities that do not necessarily need human interaction. MTC and NB-IoT devices can be categorized as narrowband (NB) devices. Depending on the particular implementation, a NB device may communicate with one or more servers or with other devices. Typically, MTC is related to low-power wide-area network (LPWAN) type communications and NB-IoT is related to small devices connected to the Internet or each other (ad-hoc network). The network operator provides network connectivity to MTC or IoT server(s) regardless of whether the server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

Examples of NB-IOT include consumer products such as headsets, Google glasses and Facebook Oculus. On the other hand, MTC is more related to vending machines, meters, vehicle modems, and other similar devices.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

NB-IoT and MTC devices can be categorized as narrowband (NB) devices since these types of devices generally use narrower bandwidth channels than other types of devices operating on a communication network. NB devices can operate on a mobile broadband (MBB) network which often operate in accordance with a communication specification. Therefore, both NB devices and MBB devices may be served by the same equipment within a communication network.

SUMMARY

A base station transmits a transmission signal to a first device and a second device where the transmission signal includes time-frequency resources using different numerologies and conveys first data to the first device and second data to the second device and common geographic location dependent control information to both devices. The transmission comprises a first set of time-frequency resources having a first numerology and a second set of time-frequency resources having a second numerology. The first data is transmitted over the first set of time-frequency resources and the common geographic location dependent control information is transmitted over the second set of time-frequency resources.

DETAILED DESCRIPTION

Figure 1A:
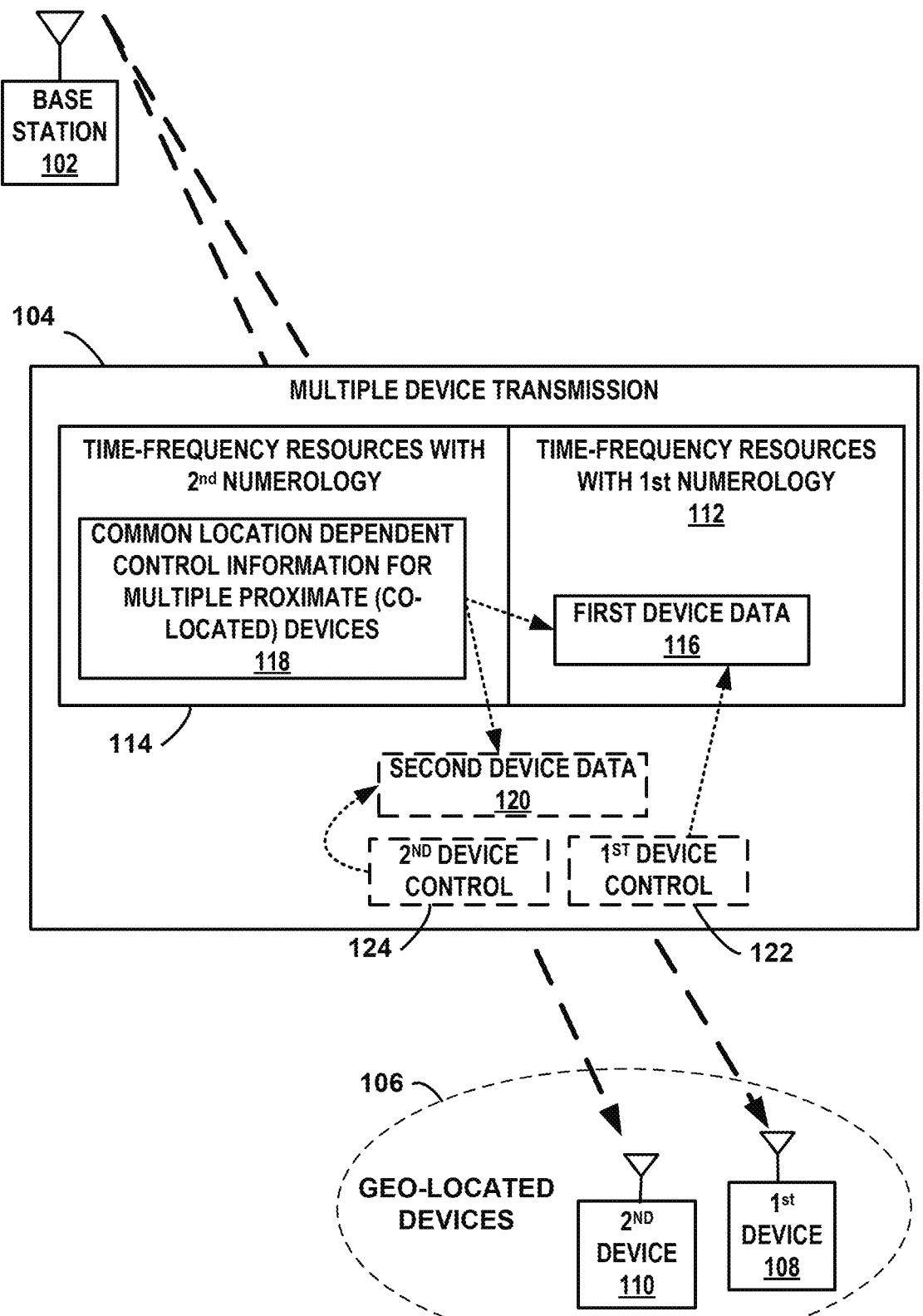
FIG. 1A is a block diagram of a wireless communication system where a base station transmits a multiple device transmission to multiple co-located user equipment (UE) devices including at least a first device 108 and a second device.

In certain situations, multiple user equipment (UE) devices may be positioned in close proximity to each other. Such situations may occur where the multiple devices are associated with the same user and may be being used at the same time. For example, a user may be watching a video on a smartphone and listening to the associated audio stream on a headset. In the recent years more and more users use multiple devices for different purposes. For example, a user carries a smartphone, a tablet and a smartwatch and each device has wireless connectivity. All these devices independently connect to the network to perform different functions. As the number of devices connected to the network increases the traffic-load increases as well as the management of these devices increases. In order to provide efficient wireless services to the multiple devices used by the same user there is a need to reduce the amount of spectrum-resources and control-signaling.

The techniques discussed herein take advantage of the proximity of multiple user equipment (UE) devices by transmitting a transmission signal that includes data for each of the UE devices and a common control message that comprises common geographical dependent control data that is generated by the base station based on the geographical location of the UE devices. The UE devices are near enough to each other that the geographical dependent control information that applies to one of the UE devices can be applied to the other UE device(s) to successfully receive the data signal at each device. The signal transmission includes sets of time-frequency resources that have different numerologies where data for at least one of the devices is transmitted over one set having a first numerology and the control message with the common geographically dependent control information is transmitted over another set having a second numerology. Where the first data and the second data is transmitted over the same set of time-frequency resources, the second data may occupy time-frequency resources not used by for the first data or the two data sets may share common time-frequency resources using code division multiplexing techniques or layered modulation techniques.

Device specific control information, including first device control information and second device control information, is also transmitted in the signal transmission in at least some examples. Device specific control information includes data layer control information where data layering is used. The data layer control information applies to a particular device and allows that device to recover the data within the data layered signal that is directed to that device. Therefore, multiple UE devices receive the same transmission signal with geographically dependent control information but recover only the data intended for the particular device. As a result, communication resources are efficiently utilized since the same time, frequency and spatial communication resources are used to transmit data to all of the UE devices while transmitting a control message that applies to all of the UE devices receiving the data signal. In addition, additional advantages are realized by transmitting the common control information over one set of resources having a first numerology and data for at least one of the devices over communication resources having a second numerology. As discussed below, the techniques discussed may be particularly useful in applications including machine type communication (MTC).

FIG. 1A is a block diagram of a wireless communication system 100 where a base station 102 transmits a multiple device transmission 104 to multiple co-located user equipment (UE) devices 106 including at least a first device 108 and a second device 110. The wireless communication system 100 may be any type of wireless communication network or system where a base station connected to communication network transmits and receive wireless to and from UE devices to provide wireless service to the devices. The communication system, therefore, may be any type of Wireless Local Area Network (WLAN) or Wireless Wide Area Network (WWAN). For the examples discussed herein, the communication system operates in accordance with a at least one communication specification such as one or more of The Third Generation Partnership Project (3GPP) 4G and 5G specifications.

The base station 102 is an eNB, eNodeB, gNodeB, access point, transceiver, radio head, or any other device performing similar tasks in a system otherwise operating in accordance with a revision of a 3GPP communication specification. The various functions and operations of the base station 102 may be implemented in any number of devices, circuits, electronics, code, or elements. The base station 102 transmits the multiple device transmission 104 to at least two UE devices 108, 110 that are sufficiently close to each other to result in at least some similar receiver settings to receive the transmission 104.

The transmissions from the base station 102 employ a frequency-division multiplexing (FDM) scheme and, for the examples herein, are orthogonal frequency-division multiplexing (OFDM) signals where digital data is encoded on multiple carrier frequencies. The communication resources used for transmission include time-frequency resources where time is divided on multiple subcarriers. For the examples herein, base stations provide different services over a block of continuous spectrum by supporting FDM based multiple numerologies. The OFDM numerology may be configurable in order to meet different requirements of each service type. The transmission 104 utilizes at least two sets of time-frequency resources with different numerologies. The numerology defines the structure and organization of the time-frequency resources. For the OFDM transmission the numerology defines at least the subcarrier spacing (SCS), and cyclic prefix (CP). Differences in SCS result in different symbol-duration and therefore lead to different associated CP lengths. The numerology is configurable in order to meet different requirements of each service type.

For the example, the multiple device transmission 104 includes a first set of time-frequency resources 112 having a first numerology and a second set of time-frequency resources 114 having a second numerology. First device data 116 for the first device 108 is transmitted over at least some of the resources in the first set of time-frequency resources 112. The common geographically dependent control information 118 applicable to both UE devices is transmitted over at least some resources of the second set of time-frequency resources 114.

For the examples herein, second device data 120 and device specific control information 122, 124 is also transmitted in the multiple device transmission 104. The second device data 120 and the device specific control information 122, 124 may be transmitted using the first set of time frequency communication resources 112 or the second set of time frequency communication resources 114 depending on the particular implementation example. The blocks representing the second device data 120 and the first device specific control information 122 and the second device specific control information 124 are shown with dashed lines in FIG. 1 to indicate that the data and information may be transmitted with different combinations of communication resources comprised of the first set 112 and second set 114. As discussed below, for example, the second device data can be transmitted over the first set of time-frequency resources 112 where the first device control information 122 and the second device control information 124 are transmitted over the second set of time-frequency resources 114.

Figure 1B:
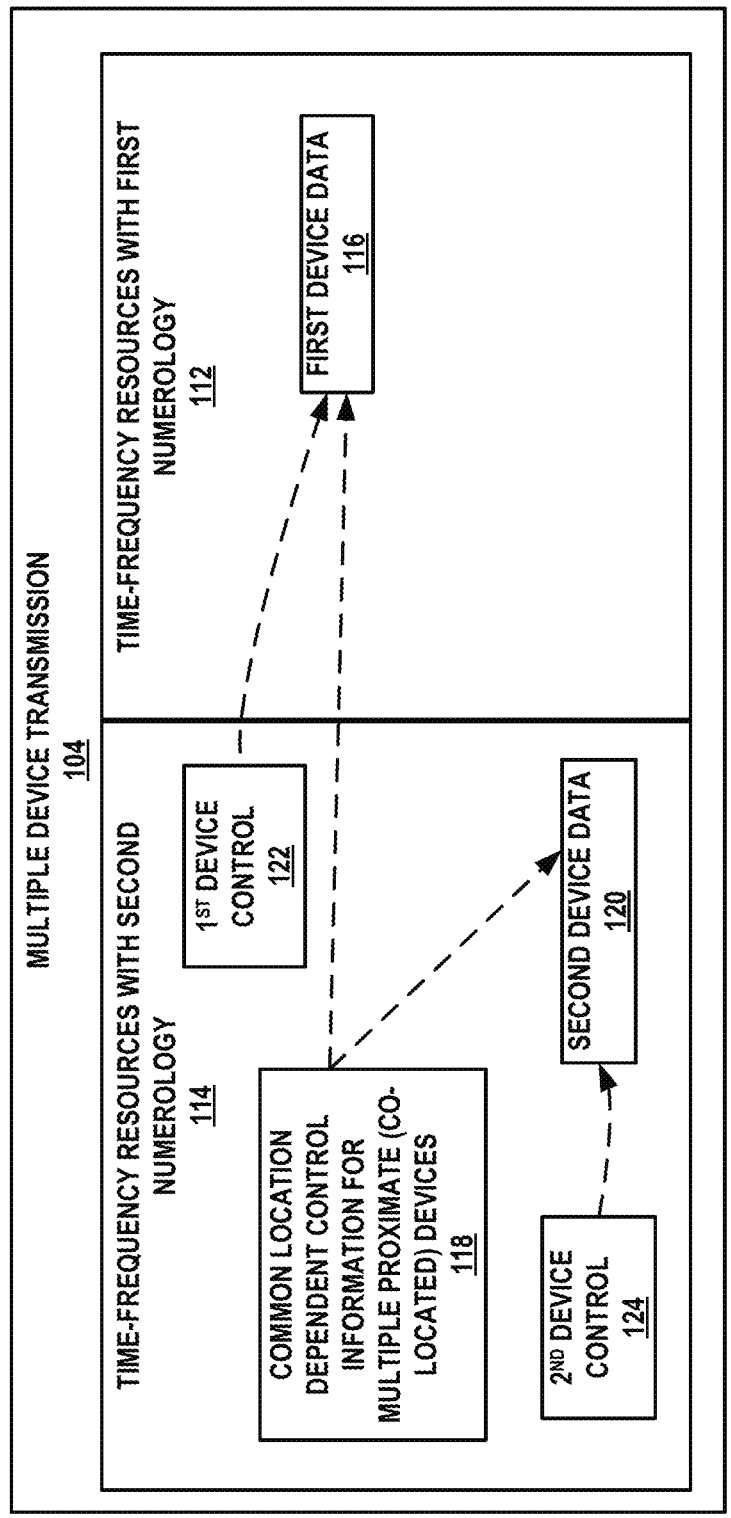
FIG. 1B is a block diagram of a multiple device transmission for an example where the first device data is transmitted over the first set of time-frequency resources and the device specific control information and the second device data is transmitted over the second set of time-frequency resources.

FIG. 1B is a block diagram of a multiple device transmission 104 for an example where the first device data 116 is transmitted over the first set of time-frequency resources and the device specific control information 122, 124 and the second device data is transmitted over the second set of time-frequency resources. The second device data 120 therefore is transmitted over time-frequency resources having a different numerology than the time-frequency resources for transmitted the first device data 116. The first device control information 122 and the second device control information 124 are also transmitted over the time-frequency resources having the second numerology. Such a scenario may be useful where the first device is a UE device requiring relatively higher mobile broadband (MBB) data rates for service and the second UE device is an MTC device requiring relatively lower data rates. The first numerology for such a scenario, therefore, facilitates higher data rates and may include a subcarrier spacing (SCS) that results in relatively wide subcarriers, for example. The second numerology may more efficiently support lower data rates with, for example, a SCS that includes narrower subcarriers. As with other examples discussed herein, transmitting the common location control information 118 with the second numerology increases transmission efficiency in the system.

Figure 1C:
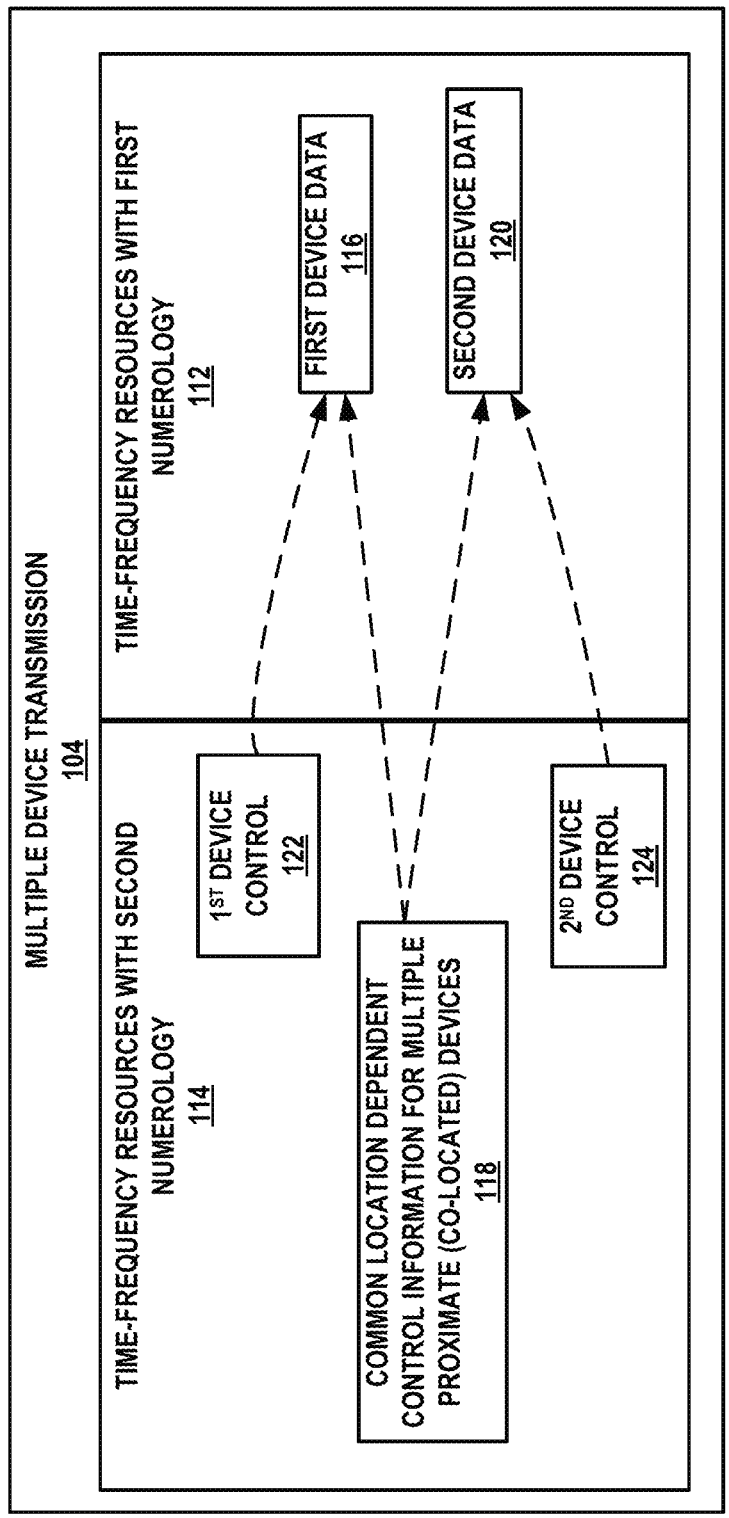
FIG. 1C is a block diagram of a multiple device transmission for an example where the first device data 116 and the second device data is transmitted over the first set of time-frequency resources and the device specific control information is transmitted over the second set of time-frequency resources.

FIG. 1C is a block diagram of a multiple device transmission 104 for an example where the first device data 116 and the second device data 118 is transmitted over the first set of time-frequency resources and the device specific control information 122, 124 is transmitted over the second set of time-frequency resources.

Figure 1D:
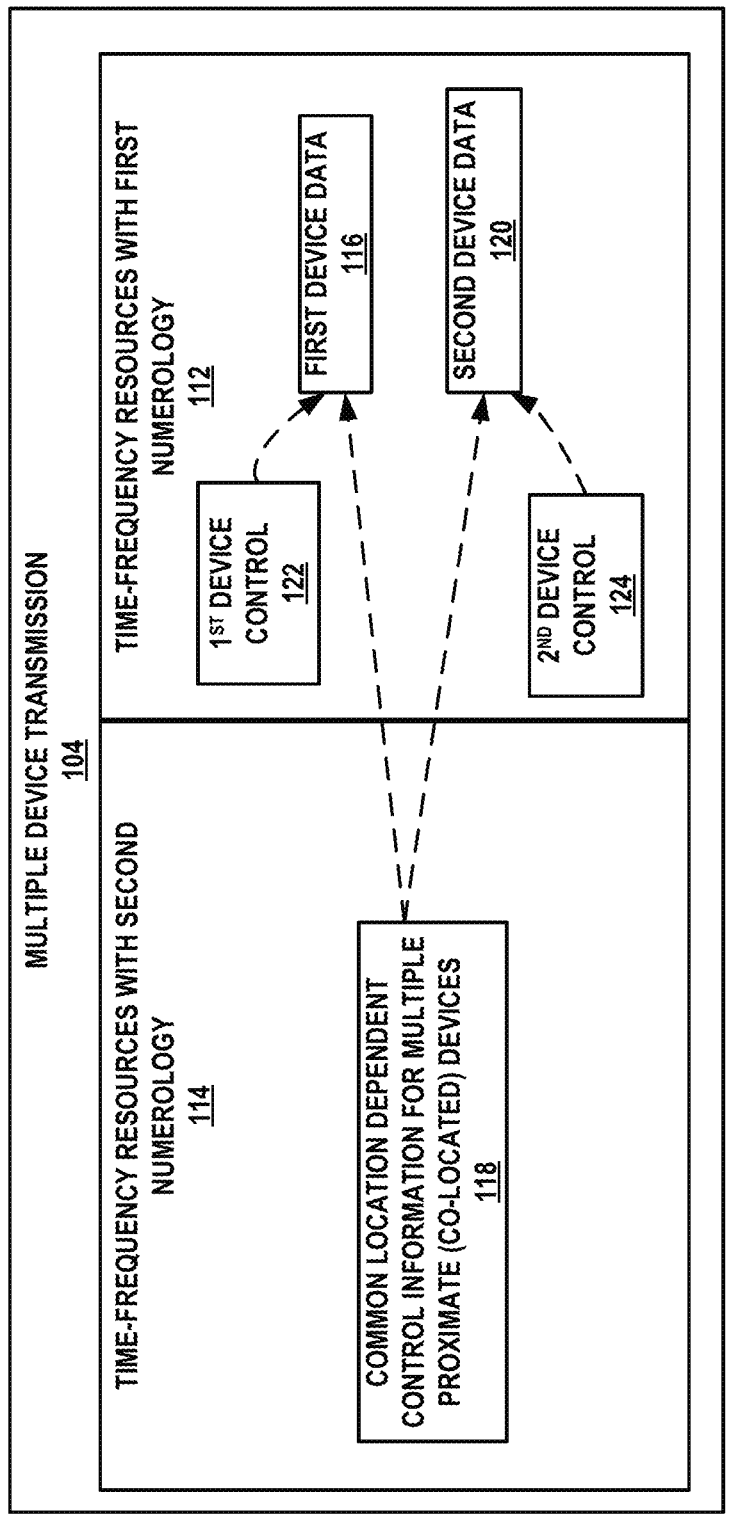
FIG. 1D is a block diagram of a multiple device transmission for an example where the first device data and the second device data, and the device specific control information is transmitted over the first set of time-frequency resources and the common location dependent control information is transmitted over the second set of time-frequency resources.

FIG. 1D is a block diagram of a multiple device transmission 104 for an example where the first device data 116 and the second device data 118, and the device specific control information 122, 124 is transmitted over the first set of time-frequency resources and the common location dependent control information 118 is transmitted over the second set of time-frequency resources. Such a scenario may be useful where Paging/Wake-up signals are sent to a headset and a smartphone in the second set of time-frequency resources 114 and then data/control to both the devices in 112 carrier.

In situations, such as the examples of FIG. 1C and FIG. 1D, where the first device data 116 and the second device data 120 are transmitted using the same set of time-frequency resources (e.g., the first set of time-frequency resources), the two data sets may share the same resources using layered modulation and/or CDM techniques or the second device data 120 may be "punctured" into the set of resources by applying the second device data 120 to unused time-frequency resources in the set that are not occupied with first device data. The multiple device transmission 104, therefore, shares time, frequency and spatial resources to send information to multiple devices that are located near each other. Where the data is layered, the multiple device transmission 104 includes common location dependent control information 118 that applies to multiple proximate devices and device specific data control information 122, 124 that includes device specific layering control information for each device regarding the data layering parameters. The layered data uses the same time, frequency and spatial communication resources to convey device dependent data to each of the devices. Each device uses the common location dependent control information 118 and device dependent information in the device specific control information 122, 124 to receive the data 116, 120 from the layered data that is directed to that device. For two co-located devices, therefore, a first device 108 applies first information in the device specific control information 122 to recover first device data 116 and a second device applies second information in the device specific control information 124 to recover second device data 120. The proximate devices are close enough to each other such that the common control information such as spatial vectors and MIMO parameters are at least similar and, in some situations, the same. In some circumstances, the devices may be within one foot from each other. In other circumstances, the distance between the devices is less than two feet. In still other circumstances, the devices are less than three feet from each other. Other distances between the devices may also be possible depending on the particular system implementation and channel conditions.

Figure 2:
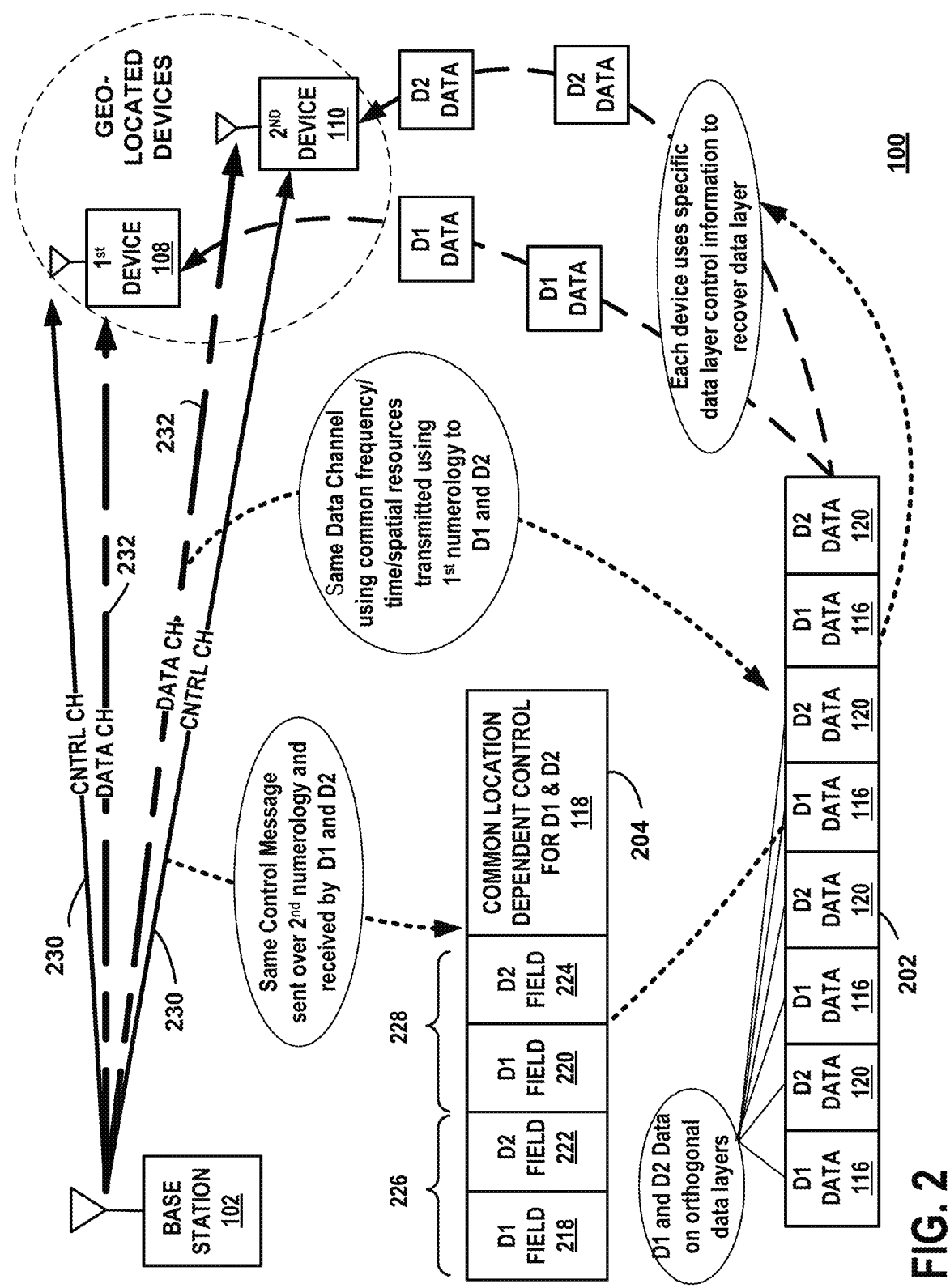
FIG. 2 is a block diagram of a communication system with a base station transmitting a multiple device transmission including layered data and a control message to multiple user equipment (UE) devices.

FIG. 2 is a block diagram of a communication system 100 with a base station 102 transmitting a multiple device transmission 104 including layered data 202 and a control message 204 to multiple user equipment (UE) devices 108, 110. FIG. 2 is an example of the system 100 of FIG. 1A where the first device data 116 and the second device data 120 are transmitted as layered data 202 in the first set of time-frequency resources 112. For the example of FIG. 2, the device specific data 122, 124 and the communication location depend control information 118 are transmitted over the second set of time-frequency resources 114. The control message 204 and the layered data signal 202, therefore, are an example of the multiple device transmission 104. The base station 102 arranges the data on the layered data signal 202 such that first device data 118 directed to the first device 108 is transmitted within a first data layer of the signal and second data 120 directed to a second device 110 is transmitted within a second data layer of the signal. Although the data layering may be applied using any of several techniques, two examples discussed herein include applying layered modulation to the data and applying code division multiplexing (CDM) to the data. The base station 102 also sends a control message 204 that includes control information regarding reception of the data layered signal 202 at the UE devices 108, 110. The control message 204 includes the common geographical location dependent control information 118 and at least one data layer information field for each device. For the example of FIG. 2, two data layering information fields 218, 220 are assigned to the first device and two data layering information fields 222, 224 are assigned to the second device 110. As discussed above, the common geographical location dependent control information 118 is control information that results, or is otherwise dependent on, the location of the UE devices 108, 110. Examples of common geographical location dependent control information 118 includes MIMO settings Precoding Matrix Index (PMI), PMI Confirmation bit, Power Offset between PDSCH and RS, DM-RS Scrambling Sequence Index, Number of Layers, and Phase-tracking RS Sequence Index. As mentioned above, the control message 204 also includes data layering information 226, 228 that is arranged in data layering information fields 218, 220, 222, 224 associated with each UE device 108, 110. For the examples discussed herein, each data layer information field is directed to a particular UE device and includes information that allows the associated UE device to recover the data directed to that UE device. The data layer information fields 218, 220, 222, 224 include information related to the data layering that is used by the UE device to recover the data intended for the UE device. In situations where the data is layered using layered modulation, the data layer information fields may include modulation coding scheme (MCS), redundancy version (RV), new data indicator (NDI), and data sequence information for each data stream. Where CDM is used for the data layering, the data layering information fields may include information to the related CDM codes used for scrambling or spreading, for example. For the example of FIG. 2, the control message 204 includes a first data layering information field 218 for the first device 108, a second data layering information field 220 for the first device, a first data layering information field 222 for the second device, and a second data layering information field 224 for the second device. Therefore, first data layering information 226 includes a first field 218 and a second field 222 where the first field 218 includes information for the first device 108 and the second field 222 includes information for the second device 110. Second data layering information 228 includes a first field 220 and a second field 224 where the first field 220 includes information for the first device 108 and the second field 224 includes information for the second device 110. As an example, the first data layering information 226 may be the MCS where the first field includes the MCS for the first data layer (first modulation and the coding rate) for the first data directed to the first device and the second field includes the second MCS for the second data layer for the second data layer (second coding rate) directed to the second device. The second data layering information 228 may include an indication of whether the data is assigned to the LSB or the MSBs of the modulated symbols. Where CDM is used for data layering the data layering information 226 may include multiplexing codes for each device in each field. The control message 204 can include any number of data layering information parameters and fields depending on the particular situation. In addition to device specific control information regarding the data, the control message includes common control information related to the data. For example, where the time-frequency resources used for the data are the same for the UE devices, the common control information related to the data may include information identifying the time-frequency resources where the data is located in the data signal.

The base station 102, therefore, transmits the control message 204 over the control channel 230 to the first UE device 108 and to the second UE device 110 and transmits the first data 116 and the second data 120 in a data layered signal 202 over the data channel 232 to the first UE device 108 and the second UE device 110. The control channel 230 is transmitted using the second numerology over the second set of time-frequency resources 114. The data channel 232 uses the first numerology and at least some of the first set of time-frequency resources 112. The first UE device 108 receives the control message 204 and applies the common control information 118 to the receive the data layered signal 202 and applies the data layering control information 226, 228 in the first device data layering information fields 218, 220 to recover the first data (D1 data) 116. The second UE device 110 receives the control message 204 and applies the common control information 118 to receive the data layered signal 202 and applies the data layering control information 226, 228 in the second device data layering information fields 222, 224 to recover the second data (D2 data) 120.

Figure 3:
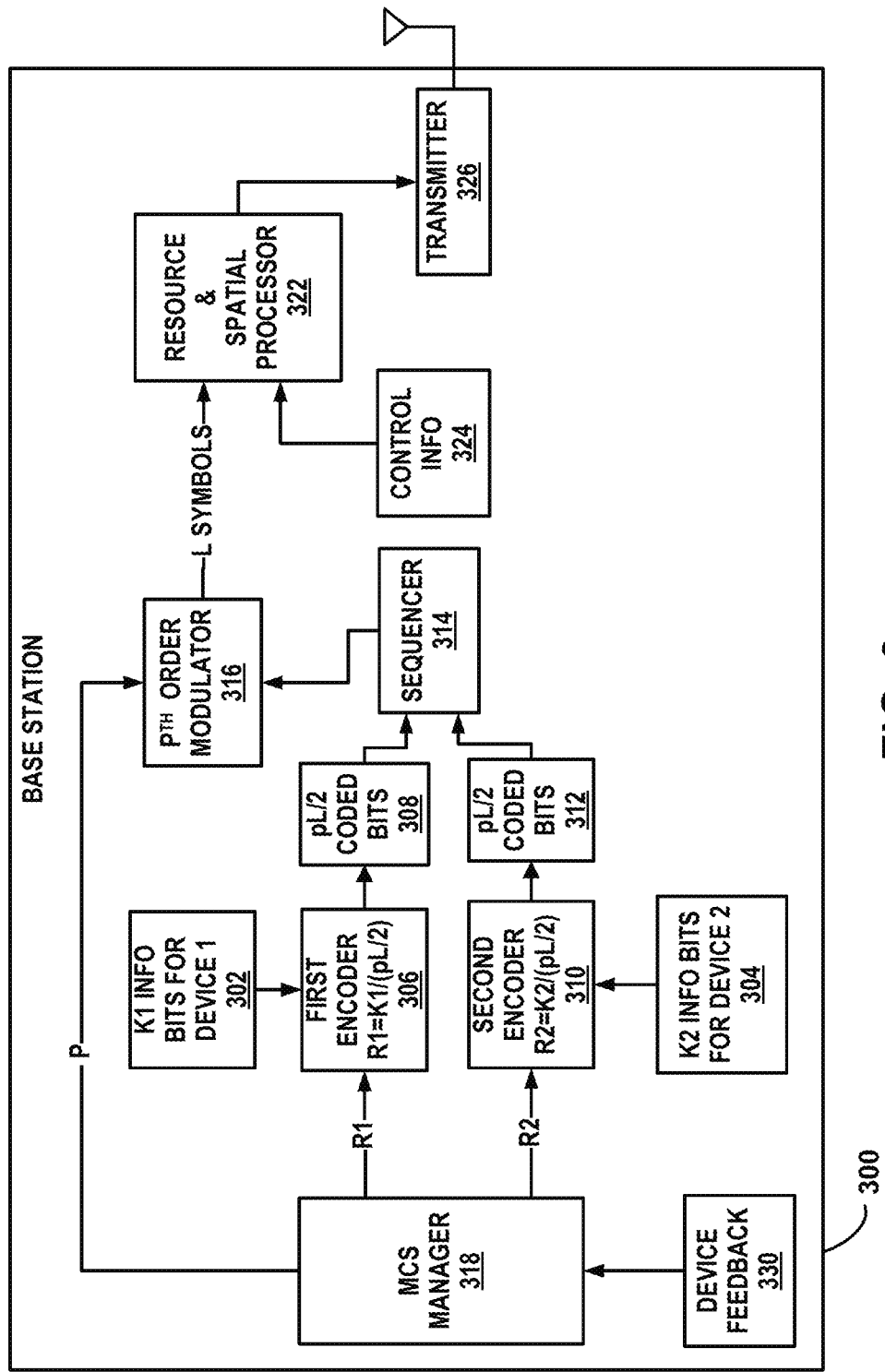
FIG. 3 is a block diagram of the base station for an example where the data layering technique includes layered modulation.

FIG. 3 is a block diagram of the base station 300 for an example where the data layering technique includes layered modulation. Accordingly, the base station 300 of FIG. 3 is an example of the base station 102 in the examples above. The base station 300 separately encodes the data for each device and modulates the encoded data to generate the layered modulation signal that is transmitted to both devices. For the example of FIG. 3, the base station 300 is an eNB, eNodeB, access point, transceiver station, radio head, or any other device performing similar tasks in a system otherwise operating in accordance with a revision of a 3GPP communication specification such as 4G and 5G specifications. The various functions and operations of the blocks described with reference to the base station 300 may be implemented in any number of devices, circuits, electronics, code, or elements. Two or more of the functional blocks may be integrated in a single device, and the functions described as performed in any single block may be implemented over several devices. For example, the functions of the two encoders 306, 310 in the base station 300 may be performed by a single device able to apply different coding rates to different sets of bits. Also, the functions of the encoders 306, 310 and sequencer 314 may be performed by a single signal processing device in some circumstances.

First data 302 intended for the first device 108 includes K1 number of information bits. Second data 304 intended for the second device 110 includes K2 number of information bits. The first data information bits 302 are coded by a first encoder 306 having a first coding rate (R1) to generate a first set of coded bits 308. The second data information bits 304 are coded by a second encoder 310 having a second coding rate (R2) to generate a second set of coded bits 312. A sequencer 314 combines the bits from the first set of coded bits 308 and from the second set of coded bits 312 in a sequence of bits that is modulated by the modulator 316. The sequence of bits includes an equal number of first coded bits 308 and second coded bits 312 in the example. The modulator 316 is a $p^{th}$ order modulator that applies layered modulation to the sequence of coded bits. A MCS manager 318 determines the coding rates and modulation order at least partially based on feedback 320 from one of the UE devices. The MCS manager 316 evaluates the required quality of service (QoS) and channel conditions to determine the appropriate modulation order and coding rates. For the example, only one of the UE devices provides feedback 320 regarding reception of signals transmitted by the base station 320. Since the UE devices 108, 110 are near each other, it is assumed that the feedback from one device is similar to feedback that would have provided by another device. In some circumstances, however, feedback 320 may be provided by multiple UE devices even though they are positioned close to each other. Examples of device feedback include parameters related to channel conditions and timing.

The L symbols generated by the modulator 316 are processed by a resource and spatial processor 322 before being transmitted by the transmitter. Control information 324 including the control message is also processed by the processor 322 before transmission. Resource mappings includes assigning timeslots and subcarriers to be used for the transmission. Spatial processing includes applying the spatial coefficients based on the MIMO parameters to the signal before transmission. For example, a beamforming vector (precoding) can be applied to the transmission signal. The control information may have the same spatial processing parameters as the transmission signal.

A transmitter 326 transmits the layered modulated signal 104 within the service area, or sector of the service area, of the base station 300. For the example, the coding rates, K1, and K2 are selected such that the number (K1) of coded bits 308 in the first set is equal to the number (K2) of coded bits 312 in the second set. If L is the total number of modulated symbols generated in the data layered signal 104, the number of coded bits in the first set of coded bits and the number of coded bits in the second set of coded bits is equal to pL/2 where p is the modulation order of the modulator 316. The coding rate of the first encoder is R1 and the coding date of the second encoder is R2 where R1=K1/(pL/2) and R2=K2/(pL/2).

For the example of FIG. 3, the layered modulation results from the sequencing of the encoded bits such that the first data 116 is represented by the most significant bits (MSB) in the modulated symbol and the second data is presented by the least significant bits (LSB) in the modulated symbol. The sequencer 314 applies the coded bits from the first encoder 306 as the most significant bits of the symbol and applies coded bits from the second encoder 310 to the least significant bits of the symbol. In some situations, the sequences of coded bits are predetermined and static. In other circumstances, however, the sequence of the bits in the transmission is dynamically changing or otherwise not known by the UE devices 108, 110. As a result, the base station 300 provides the sequence to the UE devices 108, 110 as part of the control information in the control message 204. Where the sequence is known to the UE devices, the sequence information is not transmitted. For example, if the sequence includes using the most significant bits from one encoder and the least significant bits from a second encoder and the devices 108, 110 are aware of the assignment, the sequence information may not need to be transmitted to the UE devices.

Typically, a base station provides Modulation and Coding Scheme (MCS) configuration information to UE devices. For the examples herein, the base station 200 provides the MCS information for both coding rates. As a result, the base station transmits MCS1 and MCS2. The receiver decodes the control channel and accordingly demodulates/decodes the associated data streams. As discussed above, the control message 204 includes common control information 118 that is dependent on the location of the UE devices and control information related to the resources used for transmitting the data and which applies to both UE devices. The control message 204 also includes specific control information related to the data layers that is unique to each UE device. For the example of FIG. 3, the control message 204 includes the MCS for the first data, the MCS for the second data, sequence information indicating LSB or MSB for the first data, sequence information indicating LSB or MSB for the second data, RV and NDI for the first data, RV and NDI for the second data, data location in the signal (which is the same for the first data and the second data), and MIMO Transmission Mode and parameters needed for spatial processing (which is the same for the first data and the second data). Additional parameter regarding the modulation layers may also be provided for each of the first data and the second data. For example, where superposition transmission techniques discussed in section 5 of 3GPP TR 36.859 v13.0.0, December 2015 are used, amplitude-weight ($\sqrt{\alpha}$) may be provided. In some situations, additional information may be provided in the control message 204. For example, the relationship between the first data and the second data may be provided. Such information may include, for example, a block number of the audio stream matching to data block number of the video stream for data buffering at each device where one device provides video to a user and the other device is providing audio.

Figure 4:
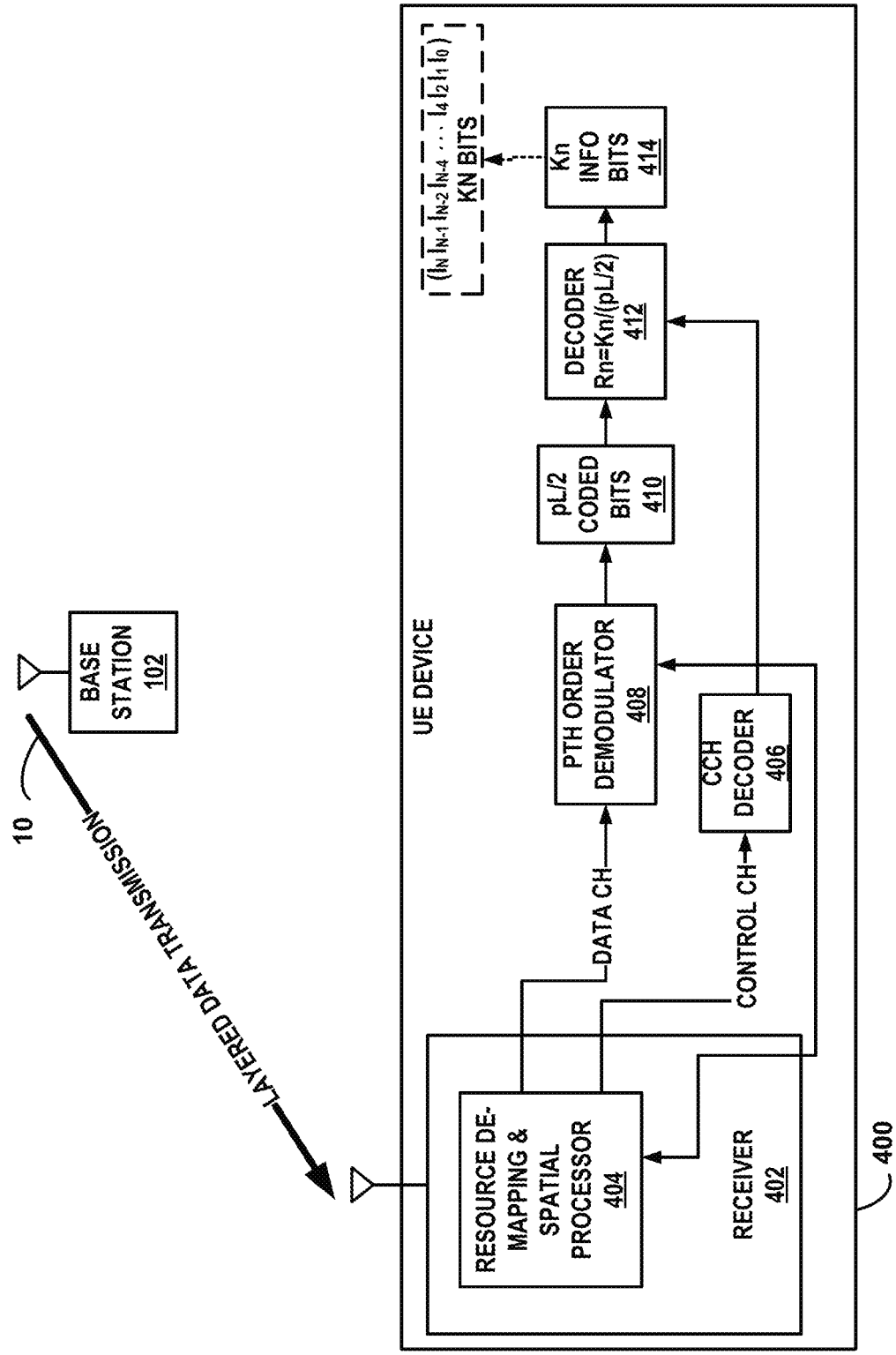
FIG. 4 is a block diagram of a UE device for an example where the layered data signal is a layered modulation signal.

FIG. 4 is a block diagram of a UE device 400 for an example where the layered data signal is a layered modulation signal. Accordingly, the UE device 400 is an example of a UE device suitable for uses as the UE device 108 and the UE device 110 for the example discussed with reference to FIG. 2. The various functions and operations of the blocks described with reference to the UE device 400 may be implemented in any number of devices, circuits, electronics, code, or elements. Two or more of the functional blocks may be integrated in a single device, and the functions described as performed in any single block may be implemented over several devices. For example, the functions of the receiver 402, the demodulator 404 as well as other spatial processing and de-mapping functions 404 may be performed by a single receiver apparatus in some circumstances.

The receiver 402 receives the data layered signal 104 from the base station 102 (200). A resource de-mapping and spatial processor 404 performs spatial processing and de-mapping. For the example, the receiver 402 applies MIMO parameters to perform spatial processing based on the control information. Resource de-mapping separates the control channel from the data channel (PDCCH and PDSCH) time/frequency resources. After decoding the PDCCH, the receiver 402 determines the exact PDSCH time/frequency resources to extract the data bits before demodulation and decoding.

The control channel information including the control message 204 is decoded by a control channel decoder 406 and the data channel portion of the signal is demodulated by the demodulator 408. The control channel decoder 206 determines the contents of the control message 204 regarding modulation order and the data layering parameters located within the data layering information fields associated with and assigned to the UE device 400. The demodulator 408 applies the modulation order parameters determined by the control channel decoder to generate the sequence of coded bits 410 that includes the coded bits 308 and the coded bits 312. In accordance with data layering information retrieved by the control channel decoder 406, the decoder 412 recovers the data directed to the UE device 400. Therefore, where the EU device 400 is the first UE device 108, the control channel decoder 406 identifies the coding rate and sequence order assigned to the first UE device 108 and the decoder 412 applies the information to recover the first data 116. Where the EU device 400 is the second UE device 110, the control channel decoder 406 identifies the coding rate and sequence order assigned to the second UE device 110 the decoder 412 applies the information to recover the second data 120.

As mentioned above, MTC devices are increasingly being used for numerous applications where the MTC devices exchange information with other devices and servers. The network facilitating communication with the MTC devices must handle the increased traffic due to the numerous MTC devices while accommodating the particular requirements and limitations of the MTC devices. At the same time, users are increasingly operating a greater number of devices where at least some of the device utilize MTC. As a result, the proximity of MTC devices associated with the same user provides an opportunity to apply the techniques discussed herein to more efficiently utilize communication resources. In addition to reducing overall consumption of resources for control information, the data layering techniques use the same time-frequency-spatial resources to service multiple devices. Further, the use of differing numerologies allows increased efficiency by transmitting the common location control information 118 over a numerology more suitable for lower data rates and transmitting MBB data for the UE device using a numerology more suitable for higher data rates.

Figure 5:
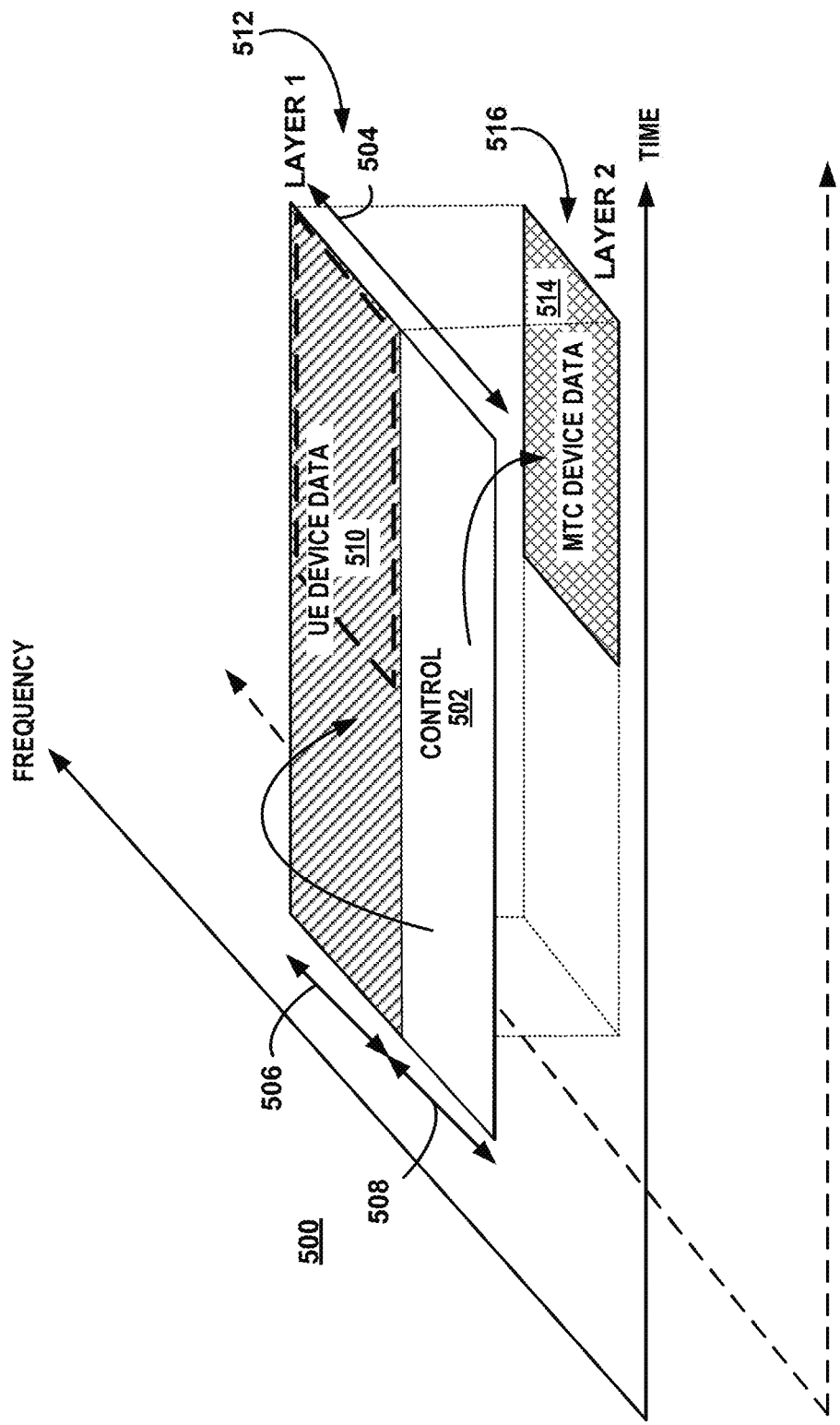
FIG. 5 is an illustration of an example of a multiple device transmission from the base station showing communication resource allocation where the first device is an MBB UE device, the second device is a MTC device that is near the MBB UE device (non-MTC device), and layered modulation is used to layer the data.

FIG. 5 is an illustration of an example of a multiple device transmission 104 from the base station 102 showing communication resource allocation where the first device 108 is an MBB UE device, the second device 110 is a MTC device that is near the MBB UE device (non-MTC device), and layered modulation is used to layer the data. The multiple device transmission 104, therefore, is a layered modulation transmission 500 for the example of FIG. 5. As an illustration, the MBB UE device may be a smartphone and the MTC device may be a headset where both devices are being used by a single user. Since the headset is an MTC device, it operates at a much narrower bandwidth than the smart phone and, therefore, transmits and receives signals at the narrower bandwidth. For the example, a control message 502 in the transmission 500 includes control information for the MTC device and the smartphone. The transmission 500 utilizes a continues block of spectrum 504 where a first set of communication resources 506 uses a first numerology and a second set of communication resources 508 uses a second numerology. For the example, the first numerology generally facilitates transmission of higher data rate transmissions and the second numerology facilitates transmission of lower data rate transmissions. The second numerology, for example, may include a SCS with narrower subcarriers than the first numerology. The device data 510 for the MBB UE device 108 is transmitted within the first set of communication resources 506. The control information 502, which includes the common location dependent information and the device specific control information 122, 124, is transmitted within the second set of communication resources 508. The MTC device data is also transmitted with the first set of communication resources but is transmitted on an orthogonal layer using layered modulation or CDM. For the example, the data information for the smartphone 108 is distributed in the entire bandwidth of the first set of communication resources 506 and information for the headset (MTC device) is only found in in a portion of the transmission the second set of communication resources. Therefore, for the example of FIG. 5, only some of the time resources on the subcarriers in second set of communication resources are multilayered with data for both devices 108, 110. The remainder of the time resources in the second set of communication resources 506 may include layered data for a third device or may only include data for the UE devices 108. In other situations, the entire set of communication resources 506 may include layered data for the two devices 108, 110.

The smartphone (UE device) 108 decodes the control message 502 and recovers the data 510 in the first data layer 512 that is directed to the smartphone. The headset 110 decodes the control message 502 and recovers the data 514 in the second data layer 516 directed to the headset (MTC device) 110. Therefore, the base station transmits a transmission signal to the UE device and the MTC device where the two devices are close enough that at least some of the control information that is dependent on device location is the same. The transmission signal includes a plurality of data subcarriers conveying UE data for the UE device. At least a portion of the data subcarriers used for the UE data also convey MTC data for the MTC device by including UE data on a UE data layer and including MTC data for the MTC device on an MTC data layer. The transmission signal also includes a plurality of control subcarriers conveying geographic location dependent control information applying to reception of the data subcarriers by the UE device and by the MTC device. In addition to the geographic location dependent control information that applies to both devices, the control subcarriers also convey data layer control information including UE data layer control information applying to recovery of the UE data from the UE data layer and MTC data layer control information applying to recovery of the MTC data from the MTC data layer. For the example, the data layer control information is arranged different fields in the downlink control information (DCI) such that a UE field contains the UE data layer control information and a MTC field contains the MTC data layer control information. Among other data layer information, the UE data layer control information identifies time-frequency resources conveying the UE data and the MTC data layer control information identifies time-frequency resources conveying the MTC data. As discussed above, the geographic location dependent control information includes control information that applies to both devices because of their common location and may include parameters such as multiple input multiple output (MIMO) parameters and transmission mode parameters.

For the examples discussed herein, the transmission signal is transmitted in accordance with at least one revision of The Third Generation Partnership Project (3GPP) Long Term Evolution (LTE) specification or 5G specifications such that the control subcarriers provide a Physical Downlink Control Channel (PDCCH) for conveying the geographic location dependent control information and the data layer control information. Also, an additional downlink control information (DCI) field in the PDCCH can includes an indication that MTC data is included on the least some of the subcarriers that are carrying UE data.

Since layered modulation is used for the example of FIG. 5, the data layer control information comprises a UE modulation order for the UE data layer and a MTC modulation order for the MTC data layer. Applying the techniques discussed above for the example, the information bits of UE data can be encoded with a first coding rate to generate first encoded bits and the information bits of the MTC data can be encode with a second coding rate to generate second encoded bits. The first encoded bits and the second encoded bits are then modulated by the modulator to generate a modulated signal including symbols representing both the MTC data and the UE data. The data layer control information includes the first encoding rate and the second encoding rate. Before modulation, the first encoded bits and the second encoded bits are arranged in a sequence of bits such that, when the sequence of bits is modulated, the UE data is represented with by the LSB or MSB of each modulation symbol and the MTC data is represented by the other of the LSB set or MSB set that is not being used for the UE data. The UE data layer control information then identifies whether the LSBs or the MSBs are representing UE data and the MTC data layer control information identifies whether the LSBs or the MSBs are representing the MTC data.

In some situations, the MTC data may be in a predetermined format that is known to the MTC device. As a result, the MTC data layer control information may include only limited information formation. In one example, the MTC data layer control information includes only a layered data indicator indicating that the MTC data is overlaid on a portion of data subcarriers conveying UE data. The MTC data layering information field, therefore, may include a one-bit flag that indicates whether there is layered MTC data. The predetermined format may include a modulation coding scheme (MCS), a size of the MTC data, and a time-frequency resources of the MTC data overlaid on the portion of data subcarriers. In situations the predetermined format may also include common spatial resources of the UE data and the MTC data.

Figure 6:
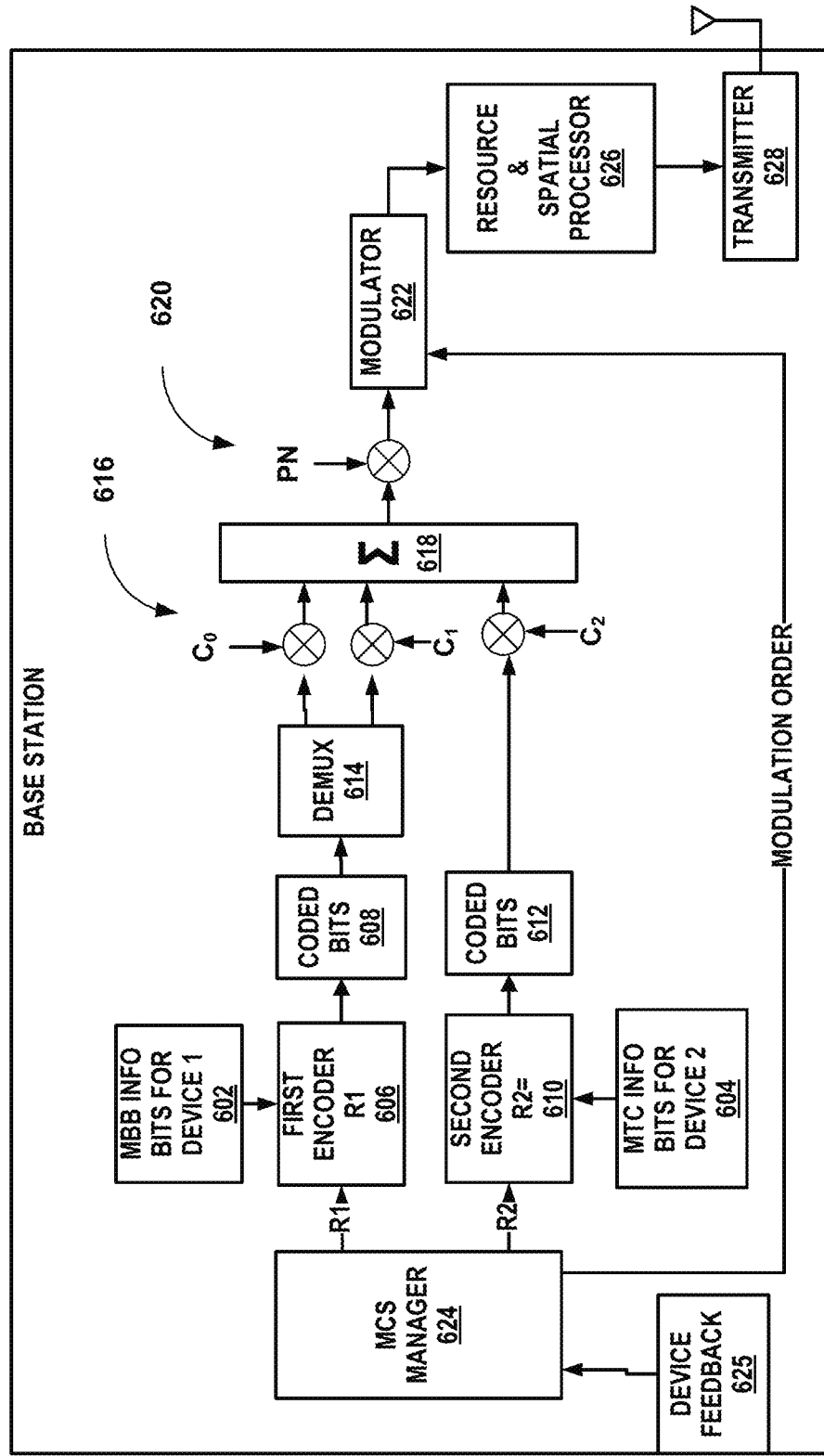
FIG. 6 is a block diagram of a base station for an example where the data layering technique includes code division multiplexing (CDM).

FIG. 6 is a block diagram of a base station 600 for an example where the data layering technique includes code division multiplexing (CDM). Accordingly, the base station 600 of FIG. 6 is an example of the base station 102 in the example of FIG. 1B. The base station 600 separately encodes the data for each device and separately modulates each set of encoded data to generate before the modulated data is code division multiplexed with orthogonal codes. The CDM signals are further processed before transmission to the devices. For the example of FIG. 6, the base station 600 is an eNB, eNodeB, access point, or any other device performing similar tasks in a system otherwise operating in accordance with a revision of a 3GPP communication specification. The various functions and operations of the blocks described with reference to the base station 600 may be implemented in any number of devices, circuits, electronics, code, or elements. Two or more of the functional blocks may be integrated in a single device, and the functions described as performed in any single block may be implemented over several devices. For example, the functions of the two encoders 606, 610 in the base station 600 may be performed by a single device able to apply different coding rates to different sets of bits.

For the example of FIG. 6, the first device is a UE device utilizing mobile broadband (MBB) and the second device is a MTC UE device. In one situation, the UE device is a smartphone and the MTC UE device is a headset as discussed above.

First data 602 intended for the first device 108 includes MBB information bits. Second data 604 intended for the second device 110 includes MTC information bits. The first MBB data information bits 602 are coded by a first encoder 606 having a first coding rate (R1) to generate a first set of coded bits 608. The MTC data information bits 604 are coded by a second encoder 610 having a second coding rate (R2) to generate a second set of coded bits 612. The first coded bits 608 are demultiplexed in a demultiplxer 614 to generate two streams where each stream is spread with a CDM code ($C_0$, $C_1$) by a code division multiplexer 616. The code division multiplexer 616 is configured to apply code division multiplexing (CDM) to the first device data and to the second device data to generate the first data layer and the second data layer. For the example, the MBB data signal is separated into two streams where one stream is spread with CDM code $C_0$ and the other is spread with code $C_1$. The MTC coded bits 612 are spread with another CDM code ($C_2$). The CDM codes ($C_0$, $C_1$, $C_2$) are orthogonal for the example. The CDM spread data streams are combined in the combiner 618 before a pseudo random (PN) sequence is applied to the combined signal by a mod 2 multiplier 620. The PN sequence (unlike the Walsh codes) is typically formed by an M-sequence. An m-sequence has excellent circular autocorrelation property where the cross-correlation of the m-sequence with any delayed version of the same m-sequence will result in a very low cross-correlation value (i.e., minimal interference). Therefore, signals meant for the first device will be much smaller when received by the second device.

A modulator 622 modulates the signal generated by the mod 2 multiplier 620 using the modulator order provided by a MCS manager 624. The MCS manager 624 determines the coding rates and modulation order at least partially based on feedback 625 from one of the UE devices. The MCS manager 624 evaluates the required quality of service (QoS) and channel conditions to determine the appropriate modulation order and coding rates. For the example, only one of the UE devices provides feedback 625 regarding reception of signals transmitted by the base station 600. Since the UE devices 108, 110 are near each other, it is assumed that the feedback from one device is similar to feedback that would have provided by another device. In some circumstances, however, feedback 625 may be provided by multiple UE devices even though they are positioned close to each other. Examples of device feedback include parameters related to channel conditions and timing.

The modulated signal is further processed by a resource and spatial processor 626. The processor 626 applies spatial processing and resource mapping. Resource mapping includes assigning timeslots and subcarriers to be used for the transmission. Spatial processing includes applying the spatial coefficients based on the MIMO parameters to the signal before transmission. For example, a beamforming vector can be applied to the transmission signal.

A transmitter 628 transmits the data layered signal 104 within the service area, or sector of the service area, of the base station 600. For the examples of FIG. 6, the control message 204 identifies the CDM codes ($C_0$, $C_1$, $C_2$) used for spreading the coded bits. Also, for the example, the transmitter 628 is an OFDM transmitter. Other types of related transmission technologies may be used to transmit the signal such as for example, Filter Bank Multicarrier (FBMC) techniques.

Typically, a base station provides Modulation and Coding Scheme (MCS) configuration information to UE devices. For the examples herein, the base station 600 provides the MCS information for both coding rates. As a result, the base station transmits MCS1 and MCS2. The receiver decodes the control channel and accordingly demodulates/decodes the associated data streams. As discussed above, the control message includes common control information 118 that is dependent on the location of the UE devices and control information related to the resources used for transmitting the data and which applies to both UE devices. The control message 204 also includes specific control information related to the data layers that is unique to each UE device. For the example of FIG. 6, the control message 204 includes the MCS for the first data, the MCS for the second data, RV and NDI for the first data, RV and NDI for the second data, Hybrid-HARQ parameters for the first data and Hybrid-HARQ parameters for the second data, data location in the signal (which is the same for the first data and the second data), and MIMO and Transmission Mode parameters needed for spatial processing (which is the same for the first data and the second data). In some situations, additional information may be provided in the control message 204. For example, the relationship between the first data and the second data may be provided. Such information may include, for example, a block number of the audio stream matching to data block number of the video stream for data buffering at each device where one device provides video to a user and the other device is providing audio.

Therefore, CDM data layered transmission allows a single control channel and a single resource allocation to deliver the two data streams to two devices that are in close proximity to each other. Generally, the use of CDM allows simultaneous use of the resources (spectrum) for multiple devices at the expense of reduced data rate. The extent of the data rate reduction depends on the length of the PN sequence (e.g., m-sequence). The longer the spreading code, the larger the data rate reduction while the spreading gain increases. The CDM data layering technique, however, allows the network to bias the data rate among the supported devices by allocating one or more CDM codes (e.g., Walsh codes) to specific devices based on application or device type. In particular, depending on the required data rate for each of the devices, the network may vary the number of CDM codes assigned to one device relative to another device. For the example of FIG. 6, the first device (MBB device) is allocated two CDM codes ($C_0$ and $C_1$) while the second device (MTC device) 110 is provided with one CDM code (C2) since the second device 110 requires a relatively lower data rate than first device 108. The receiver of the first device combines the data from the two data streams coded with $C_0$ and $C_1$. The code lengths of all of the codes are same for the example.

Figure 7:
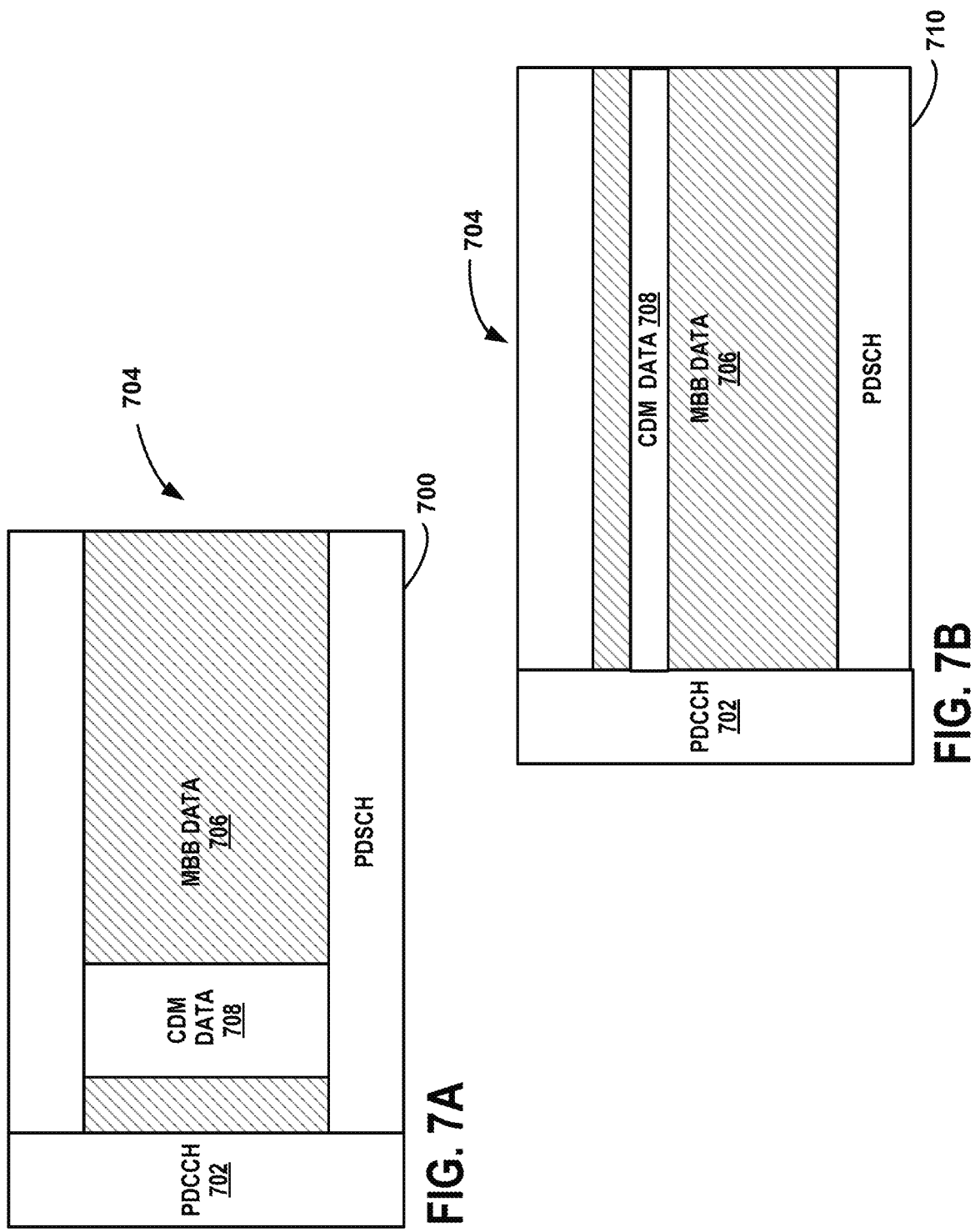
FIG. 7A is a block diagram of the data layered signal using CDM where the MTC data is overlaid on the MBB data using time division multiplexing (TDM)
FIG. 7B block diagram of the data layered signal using CDM where the MTC data is overlaid on the MBB data using frequency division multiplexing (FDM).

The MTC data symbols are overlaid on the MBB data using either time division multiplexing (TDM) or frequency division multiplexing (FDM). FIG. 7A is a block diagram of the data layered signal 700 using CDM where the MTC data is overlaid on the MBB data using time division multiplexing (TDM). Accordingly, the transmission of FIG. 7A is an example of the multiple device transmission 104 and control message 204 where the data layered is performed using CDM/TDM. The transmission 700 includes a control portion 702 such as a physical downlink control channel (PDCCH) and a data portion 6704 such as physical downlink shared channel (PDSCH). The data portion 704 includes the MBB data 706 and the MTC data 708 where the MTC data 708 is overlaid on the MBB data using CDM.

FIG. 7B block diagram of the data layered signal 710 using CDM where the MTC data is overlaid on the MBB data using frequency division multiplexing (FDM). Accordingly, the transmission of FIG. 7B is an example of the multiple device transmission 104 and control message 204 where the data layering is performed using CDM/FDM.

Therefore, the MTC data symbols are either CDM/TDM or CDM/FDM overlaid on the MBB data symbols which is part of a larger resource allocation for the MBB data transmission. Generally, the MTC transmissions have a relatively very small amount of data with a relatively large control signaling overhead. Sharing the control resources between the two devices allows the MTC data transmissions to have much lower controlling overhead by sharing the control signal used for the associated MBB data. The same PDCCH carrying the DL control information (DCI) is decoded by both the devices for obtaining the scheduling assignments. For the example, an additional field is added in the DCI to indicate to the devices that a portion of the MBB data has CDM transmissions. The DL control information (DCI) can be transmitted within other types of control channels. In some situations, for example, the enhanced physical downlink control channel (EPDCCH) defined by at least one revision of the 3GPP communication specification can be used. Such a scheme may provide advantages to MTC devices because of the narrower bandwidth receivers that these types of devices may employ.

Figure 8:
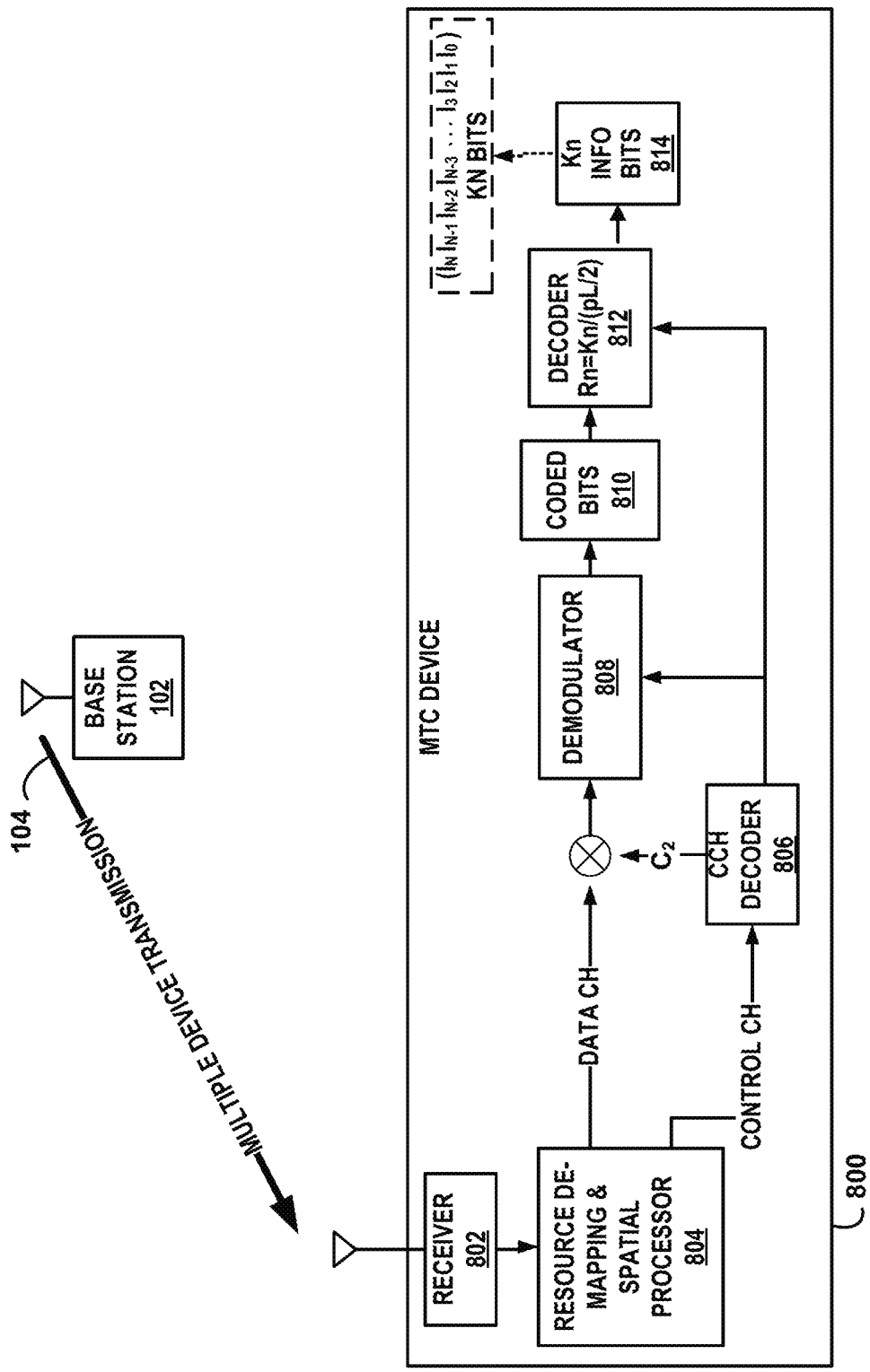
FIG. 8 is a block diagram of a UE device 800 for an example where the layered data signal is a layered using CDM.

FIG. 8 is a block diagram of a UE device 800 for an example where the layered data signal is a layered using CDM. For the example of FIG. 8, only a single CDM code is used to de-scramble or de-spread the demodulated signal. As a result, FIG. 8 is an example of the second UE device 110 for the implementation shown in FIG. 6. The techniques discussed may be applied to other UE devices may more than one CDM code is used such as the first device. The various functions and operations of the blocks described with reference to the UE device 800 may be implemented in any number of devices, circuits, electronics, code, or elements. Two or more of the functional blocks may be integrated in a single device, and the functions described as performed in any single block may be implemented over several devices. For example, the functions of the receiver 802, the demodulator 806 as well as other spatial processing and de-mapping functions 804 may be performed by a single receiver apparatus in some circumstances.

The receiver 802 receives the multiple device signal 104 from the base station 102. A resource de-mapping and spatial processor 804 performs MIMO and spatial parameters to de-map and spatially process the signal as discussed above. The control channel information including the control message 204 is decoded by a control channel decoder 806 and the data channel portion of the signal is de-spread and then demodulated by the demodulator 808. The same control channel within the second set of time-frequency resources 114 carrying the DL control information (DCI) is decoded by both the devices for obtaining the scheduling assignments.

In some circumstances, the CDM code ($C_2$) is configured based on hashing of the identification (ID) of the MTC device to one of 32 or 64 CDM codes. For example, where the MTC ID is known to the base station 102, the MTC device can apply its ID to determine which of the CDM codes is being used for the MTC data. Therefore, as an alternative, to the CCH decoder 806 determining the CDM code ($C_2$) from the control information, the CDM code can be selected based on the MTC ID The control channel decoder 806 determines the contents of the control message 204 regarding modulation order and the data layering parameters located within the data layering information fields associated with and assigned to the UE device 800. The data layering control information fields include the CDM code ($C_2$) for de-spreading the incoming signal. The demodulator 808 applies the modulation order parameters determined by the control channel decoder to generate the sequence of coded bits 810 that includes the coded bits 712. In accordance with the control information retrieved by the control channel decoder 806, the decoder 812 recovers the MTC data directed to the UE device 800.

Figure 9:
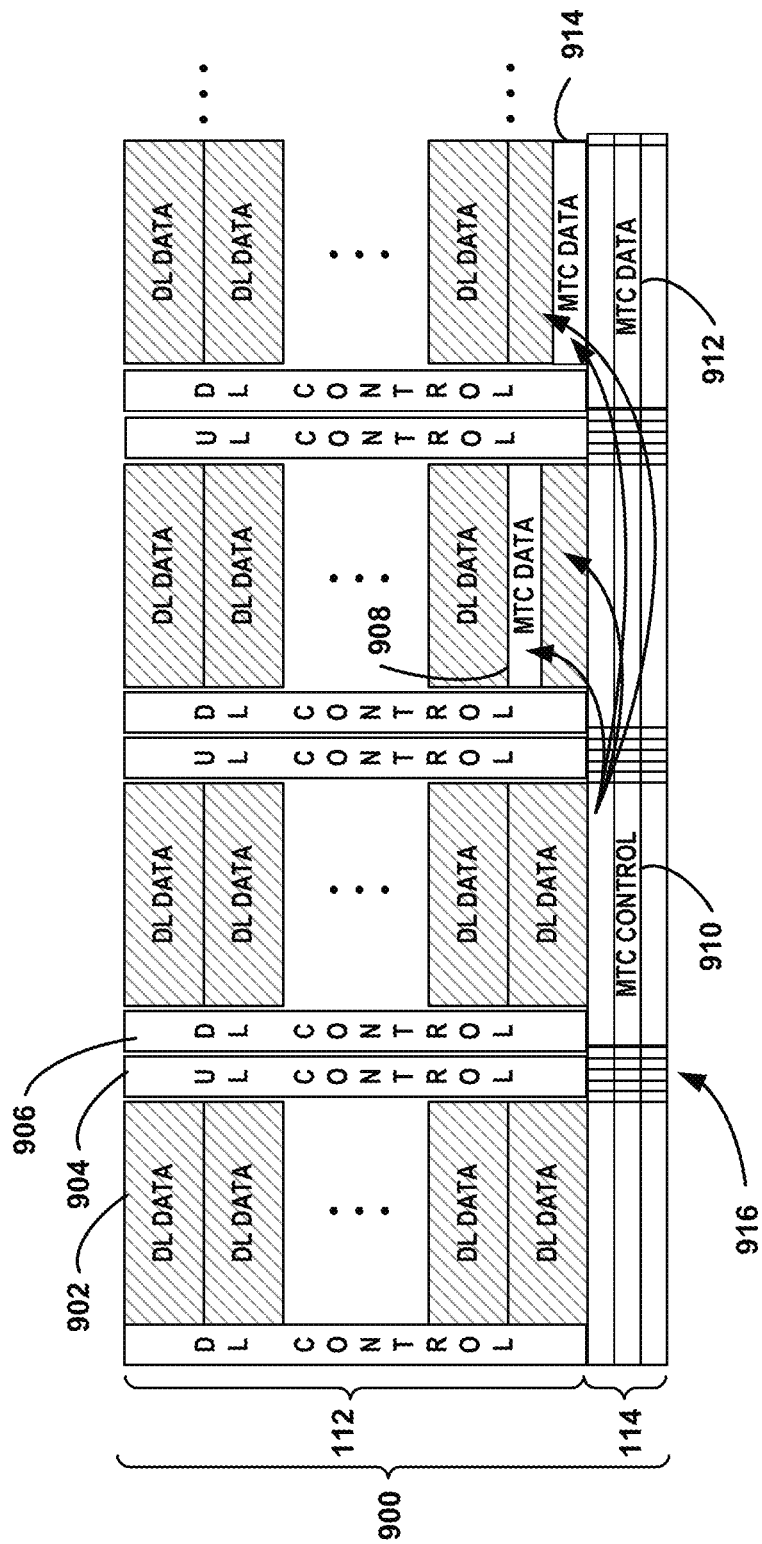
FIG. 9 is block diagram of transmissions from a base station for an example where a continuous block of spectrum includes a first set of time-frequency resources adjacent to a second set of time-frequency resources.

FIG. 9 is block diagram of transmissions from a base station 102 for an example where a continuous block of spectrum 900 includes a first set of time-frequency resources 112 adjacent to a second set of time-frequency resources 114. For the example of FIG. 9, the first set of time-frequency resources has an OFDM numerology that includes a SCS with wider subcarriers and the second set of time-frequency resources has an OFDM numerology that includes a SCS with narrower subcarriers. The first set of resources 112 supports a downlink (DL) data channel 902, an uplink control (UL) channel 904 and a DL control channel. The DL data channel conveys MBB data for the MBB UE device 108 and MTC data 910, 912 for an MTC UE device 110. The common geographically depend control information 118 is transmitted with the MTC downlink control channel 910. For the example, the device specific control information 122, 124 identifying the location of the MBB data and the MTC data in the first set of communication resources also transmitted within the MTC control channel 910 in the second set of communication resources. In some situations, the device specific control information for the first UE device is transmitted in the DL control channel 906.

For the example, the blank symbols 916 are "punctured" within the MTC DL channels to match the time-durations of the receive-to-transmit (RX/TX) switching gap in the MBB transmissions. In some situations, blank symbols are punctured within the MTC DL to match the time-durations of the UL MBB transmissions.

Figure 10:
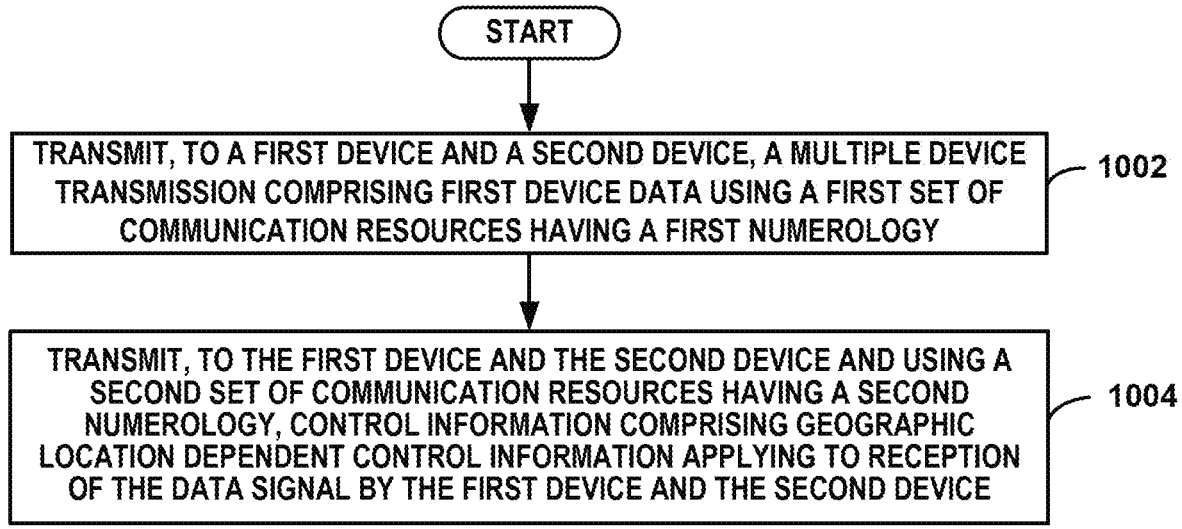
FIG. 10 is a flow chart of an example of a method of transmitting a multiple device transmission to multiple devices that are in close proximity to each other.

FIG. 10 is a flow chart of an example of a method of transmitting a multiple device transmission 104 to multiple devices that are in close proximity to each other. The steps of FIG. 10 can be performed in a different order than shown and some steps may be combined into a single step. Additional steps may be performed and some steps may be omitted. For the example, the method is performed by the base station 102.

At step 1002, the base station transmits a multiple device transmission 104 to a first device and to second device where the two devices are close to each other. As discussed above, the devices are close enough to each other such that control information dependent on location such a spatial vectors and MIMO parameters are at least similar and may be the same. For the example, the multiple device transmission includes first device data directed to a first device and second device data directed to a second device where at least the first device data is transmitted using a first set of time frequency communication resources having a first numerology.

At step 1004, control information is transmitted to the first device and the second device where the control information comprises geographical location dependent control information that is common to both devices. The control message may also include device specific data control information that is specific to each device.

At least the geographical location dependent control information is transmitted using a second set of time-frequency communication resources having a second numerology different from the first numerology. Each device receiving the control information and data, applies the common control information and the device specific control information to recover the data that is directed to that device.

Figure 11:
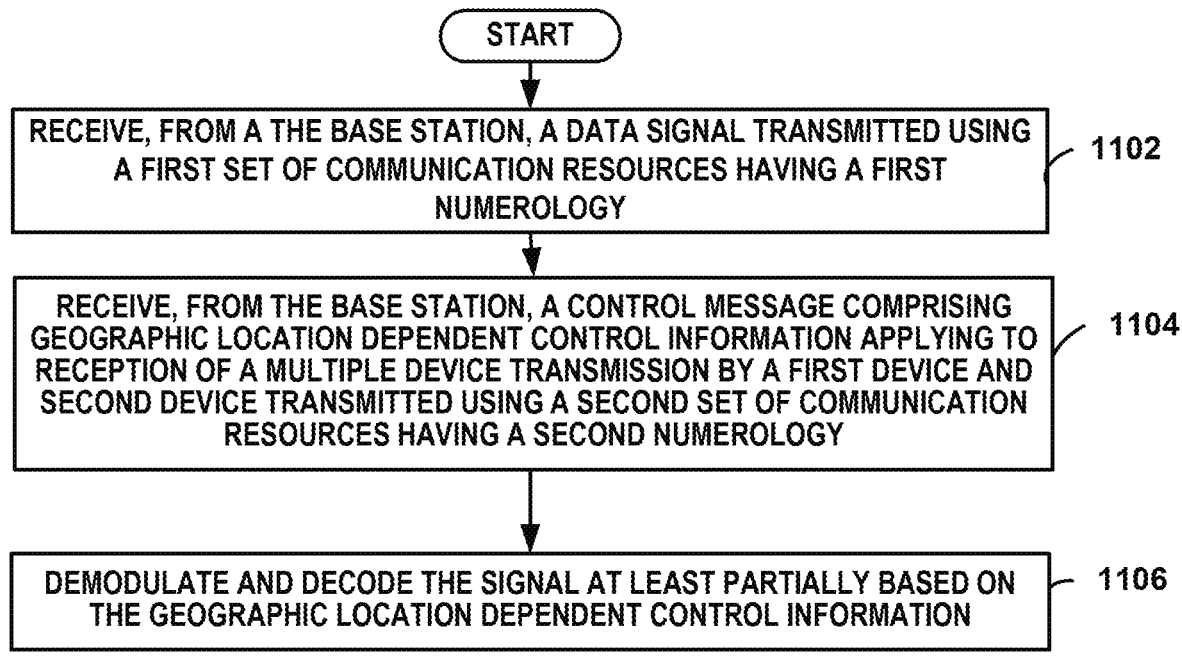
FIG. 11 is a flow chart of a method of receiving a multiple device transmission 104 at an MBB UE device.

FIG. 11 is a flow chart of a method of receiving a multiple device transmission 104 at a MBB UE device. The steps of FIG. 11 can be performed in a different order than shown and some steps may be combined into a single step. The control information, for example, may be received before the data signal in may circumstances. Additional steps may be performed and some steps may be omitted. For the example, the method is performed by an MBB UE device such as the first UE device 108.

At step 1102, a data signal transmitted using a first set of time-frequency communication resources having a first numerology is received.

At step 1104, control information is received from the base station where the control information comprises geographic location dependent control information which applies to reception of the data signal by MBB UE device and reception by a second device. The control information may also include device specific control information. At least the geographic location dependent control information is transmitted using a second set of time-frequency communication resources having a second numerology different from the first numerology.

At step 1106, the data signal is demodulated and decoded in accordance with at least the geographic location dependent control information. For the example, the UE device applies the common location dependent control information and device specific control information to demodulate and decode the data signal.

As discussed above, data for multiple devices may be transmitted over the first set of communication resources where the resources are shared. Techniques such as layered modulation and CDM can be used to convey multiple sets of data over the same resources.

Therefore, the various techniques discussed above provide an efficient mechanism for conveying data and control information to multiple devices positioned at a common location by using different OFDM numerologies. Control information includes common control information that applies to multiple devices because of the proximity of the devices to each other and can be transmitted with one set of resources having a numerology that is better suited for low data rate transmission while data can be sent to one or more of the devices using resources that have a numerology better suited for higher data rates. In some techniques, common data time-frequency communication resources can be shared between devices by layering data. Further, feedback from fewer than all of the devices can be used to set transmission, spatial, modulation, coding rate, and timing parameters for the transmission received by multiple devices where the transmission conveys different data to each device. For example, timing alignment for all collocated devices can be determined from feedback from only a single device of the group. Other considerations for opportunities for increasing efficiency and performance for the techniques discussed above include mobility mechanisms where the collocated devices receiving the transmission all handover to the same target cell together. When in IDLE mode, the collocated devices may be required to select the same cell for camping so that connection establishment and pages is applicable for all the collocated devices at the same time.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    transmitting a multiple device transmission to a first device and a second device, the first device and the second device co-located such that common geographic location dependent control information is the same for the first device and the second device, the multiple device transmission comprising:

a first set of time-frequency communication resources having a first numerology and conveying first device data for the first device, and a second set of time-frequency communication resources having a second numerology and conveying the common geographic location dependent control information applying to at least reception of the first set of time-frequency communication resources by the first device and by the second device; and introducing blank symbols within the second set of time-frequency communication resources to match a time-duration of at least one of:

an uplink transmission from the first device, and a receive-to-transmit switching gap in the first set of time-frequency communication resources.

2. The method of claim 1, wherein the first set of time-frequency communication resources conveys second device data for the second device.

3. The method of claim 2, wherein at least a portion of the first set of time-frequency resources convey at least some of the first data on a first data layer and convey the second data for the second device on a second data layer.

4. The method of claim 3, further comprising:
applying layered modulation to the first data and the second data by applying a first modulation order to the first data and a second modulation order to the second data.

5. The method of claim 3, further comprising:
encoding information bits of first data with a first coding rate to generate first encoded bits; and
encoding information bits of the second data with a second coding rate to generate second encoded bits, the first encoded bits and the second encoded bits modulated by the modulator.

6. The method of claim 3, wherein the second data is conveyed by unused time-frequency resources of the first set of time-frequency communication resources not used to convey the first data.

7. The method of claim 1, further comprising:
transmitting first device specific control information using the second set of time-frequency communication resources having the second numerology; and
transmitting second device specific control information using the second set of time-frequency communication resources having the second numerology.

8. The method of claim 7, wherein the first device specific control information indicates first device time-frequency resources used for the first data and the second device specific control information indicates second device time-frequency resources used for the second data.

9. The method of claim 1, wherein the first numerology comprises a first subcarrier spacing (SCS) with subcarriers having a first bandwidth and wherein the second numerology comprises a second SCS with subcarriers having a narrower bandwidth than the first bandwidth.

10. The method of claim 9, wherein the first device is a mobile broadband user equipment (UE) device and the second device is a machine type communication (MTC) UE device.

11. The method of claim 1, further comprising:
transmitting a multiple device transmission indicator indicating at least some control information for the first UE device is conveyed on the second set of time-frequency communication resources.

12. The method of claim 1, further comprising:
transmitting a numerology indicator indicating the second numerology and indicating at least a subcarrier spacing (SCS), a cyclic prefix (CP) and a symbol-duration.

13. A base station comprising:
a transmitter configured to transmit, a multiple device transmission to a first user equipment (UE) device and a second UE device, the first UE device and the second UE device co-located such that common geographic location dependent control information is the same for the first UE device and the second UE device, the multiple device transmission comprising:

first data directed to the first UE device and second data directed to the second UE device;

a first set of time-frequency communication resources having a first numerology and conveying first data for the first UE device;

a second set of time-frequency communication resources conveying the common geographic location dependent control information applying to reception of the first data by the first UE device and applying to reception of the second data by the second UE device; and blank symbols introduced within the second set of time-frequency communication resources to match a time-duration of at least one of:

an uplink transmission from the first device, and a receive-to-transmit switching gag in the first set of time-frequency communication resources.

14. The base station of claim 13, wherein the common geographic location dependent control information includes spatial vectors and multiple input multiple output (MIMO) parameters.

15. The base station of claim 14, wherein the first UE device and the second UE device are co-located less than three feet from each other.

16. A first user equipment (UE) device comprising:
a receiver configured to receive, from a base station, a multiple device transmission transmitted to the first UE device and a second UE device, the first UE device and the second UE device co-located such that common geographic location dependent control information is the same for the first UE device and the second UE device, the multiple device transmission comprising:

first data directed to the first UE device and second data directed to the second UE device, a first set of time-frequency communication resources having a first numerology and conveying first data for the first UE device, a second set of time-frequency communication resources conveying the common geographic location dependent control information applying to reception of the first data by the first UE device and applying to reception of the second data by the second UE device, and blank symbols introduced within the second set of time-frequency communication resources to match a time-duration of at least one of:

an uplink transmission from the first device, and a receive-to-transmit switching gag in the first set of time-frequency communication resources; and a decoder configured to apply the common geographic location dependent control information to decode the multiple device transmission to recover the first data.

17. The first UE device of claim 16, wherein the common geographic location dependent control information includes spatial vectors and multiple input multiple output (MIMO) parameters.

18. The first UE device of claim 17, wherein the first UE device and the second UE device are co-located less than three feet from each other.

19. The method of claim 1, wherein the first UE device and the second UE device are co-located less than three feet from each other.

* * * * *